(12) United States Patent
Date et al.

(10) Patent No.: US 7,438,238 B2
(45) Date of Patent: Oct. 21, 2008

(54) GASEOUS FUEL INJECTOR

(75) Inventors: Kenji Date, Obu (JP); Masaaki Kato, Kariya (JP)

(73) Assignee: Denso Corporation (JP)

( * ) Notice: Subject to any disclaimer, the term of this patent is extended or adjusted under 35 U.S.C. 154(b) by 443 days.

(21) Appl. No.: 11/256,102

(22) Filed: Oct. 24, 2005

(65) Prior Publication Data

US 2006/0086825 A1 Apr. 27, 2006

(30) Foreign Application Priority Data

Oct. 25, 2004 (JP) ............................. 2004-309175

(51) Int. Cl.
| | |
|---|---|
| F02M 41/16 | (2006.01) |
| F02M 61/00 | (2006.01) |
| F02M 51/00 | (2006.01) |
| F02M 43/00 | (2006.01) |
| F02M 21/02 | (2006.01) |
| B05B 7/12 | (2006.01) |
| B05B 7/06 | (2006.01) |
| B05B 7/04 | (2006.01) |
| B05B 1/30 | (2006.01) |
| F23D 11/16 | (2006.01) |
| F23D 11/40 | (2006.01) |
| F23D 14/62 | (2006.01) |

(52) U.S. Cl. ...................... 239/96; 239/413; 239/417.5; 239/419; 239/427; 239/533.12; 239/584; 239/585.1; 239/433; 239/434; 123/304; 123/525

(58) Field of Classification Search ................... 239/88, 239/96, 124, 413, 419, 426, 427, 433, 434, 239/471.5, 481, 533.1, 533.2, 533.3, 533.4, 239/533.5, 533.7, 533.8, 533.9, 533.11, 533.12, 239/583, 584, 585.1, 585.2, 585.4, 585.5, 239/41.5, 585.57; 123/304, 525, 527
See application file for complete search history.

(56) References Cited

U.S. PATENT DOCUMENTS

| | | | | |
|---|---|---|---|---|
| 4,691,674 | A | * | 9/1987 | Otsuka et al. ................ 123/299 |
| 4,774,909 | A | * | 10/1988 | Dolderer ...................... 123/1 A |
| 6,298,833 | B1 | * | 10/2001 | Douville et al. ............. 123/527 |
| 6,811,105 | B2 | * | 11/2004 | Kato et al. ................ 239/533.2 |

FOREIGN PATENT DOCUMENTS

| | | |
|---|---|---|
| JP | 63-4365 | 1/1988 |
| JP | 1-88054 | 6/1989 |
| JP | 2003-232234 | 8/2003 |

* cited by examiner

*Primary Examiner*—Len Tran
*Assistant Examiner*—Ryan Reis
(74) *Attorney, Agent, or Firm*—Nixon & Vanderhye PC

(57) ABSTRACT

The injector includes a nozzle, a needle, a control chamber, a working fluid supply passage, an electric switching valve, a high-pressure gaseous fuel supply passage and a lubrication liquid fuel supply passage. The nozzle has an injection hole, through which high-pressure gaseous fuel is injected. The needle is axially reciprocably received in the nozzle to open and close the injection hole. The needle includes a sliding portion and a valve portion. The control chamber applies a pressure to the needle. The working fluid supply passage supplies liquid fuel to the control chamber. The electric switching valve controls an inflow/outflow of the liquid fuel to/from the control chamber. The high-pressure gaseous fuel supply passage supplies the high-pressure gaseous fuel to the injection hole. The lubrication liquid fuel supply passage supplies the liquid fuel from the working fluid supply passage to the sliding portion and the valve portion.

9 Claims, 5 Drawing Sheets

GASEOUS FUEL INJECTOR

CROSS REFERENCE TO RELATED APPLICATION

This application is based on and incorporates herein by reference Japanese Patent Applications No. 2004-309175, filed on Oct. 25, 2004.

BACKGROUND OF THE INVENTION

1. Field of the Invention

The present invention relates to a gaseous fuel injector, which directly injects a high-pressure gaseous fuel to cylinders of an internal combustion engine.

2. Description of Related Art

In development of a next generation vehicle, a clean exhaust gas and a decrease of carbon dioxide are greatly required. However, conventional combustion technology using liquid fossil fuel may not reach this requirement. Development of a gaseous fuel engine using gas fossil fuels and hydrogen gas as alternative fuels for the liquid fossil fuel is progressing and some of the gaseous fuel engines are actually used. Here, the gas fossil fuels, which expectedly contribute effective combustion, include a natural gas and a petroleum gas.

A cylinder direct injection engine may not be used long in a case where a conventional gaseous fuel is used, because the conventional gaseous fuel has low lubricity. Thus, there may be reliability disadvantages, such as wear and burn-in of a nozzle sliding portion of the injector, and sealing failure caused by the wear of a valve portion. Also a compression ignition engine may have a disadvantage, such as an unstable operation with the gaseous fuels (e.g., the hydrogen gas and the natural gas, which have low cetane numbers).

To improve reliability and operational performance, several techniques are proposed (see Unexamined Japanese Patent Publication No. 2003-232234 and Unexamined Japanese Utility Model Publications No. S63-4365 and No. H1-88054).

Unexamined Japanese Patent Publication No. 2003-232234 discloses a two-fuel injection technique, which supplies either or both of the gaseous fuel (e.g., LPG) and the liquid fuel (e.g., gasoline) from corresponding injectors based on a state of an engine operation. According to the technique, the first fuel supply system, which supplies the gaseous fuel from the first injector, and the second fuel supply system, which supplies the liquid fuel from the second injector, are provided. In a transition from an operational state using the liquid fuel to an operational state using only the gaseous fuel, the first and second injectors simultaneously supply the gaseous fuel and the liquid fuel to the internal combustion engine to avoid an excessive lean state of an air fuel ratio. Thus, misfire or deterioration of the operational performance is limited.

Unexamined Japanese Utility Model Publications No. S63-4365 discloses a gas injector for injecting gas supplied from an accumulator to lubricate the sliding portion of the needle by a seal oil, which is supplied to the injector through an additionally provided passage to seal the needle portion. The gas injector also includes an inlet passage for supplying a working fluid to open and close a valve portion. Unexamined Japanese Utility Model Publication No. H1-88054 discloses an injector that has an improved lubricity of the needle by using the working fluid as a lubrication and storing the working fluid and the gaseous fuel in a seal oil storage.

In practice, the technique of Unexamined Japanese Patent Publication No. 2003-232234 largely depends on the liquid fuel to operate the engine in order to limit an evaporation of the liquid gaseous fuel. Thus, an effect of using the gaseous fuel may not be maximized. Also, an apparatus of the invention may become large, because the technique requires two large fuel tanks for the gas liquid and the liquid fuel, and also requires two fuel supply systems and two fuel injector valves for the two fuel tanks.

In the invention according to Unexamined Japanese Utility Model Publication No. S63-4365, the composition of the technique may be complex, because the seal oil, as well as the working fluid that drives the injector, is also supplied to the injector. Moreover, the seal oil may continuously leak into the working fluid and the gaseous fuel, because a pressure of the seal oil is applied to a seal groove of the needle. In the invention according to Unexamined Japanese Utility Model Publication No. H1-88054, a lower portion of the needle is not lubricated sufficiently, because the working fluid does not easily reach a lower portion (or an injection hole side) of the seal oil storage due to pressure of the gaseous fuel, which is applied therein. Also, the inventions according to Unexamined Japanese Utility Model Publications No. S63-4365 and No. H1-88054 are not effective for decreasing wear of the valve portion, because both inventions improve the lubricity of only the sliding portion of the needle.

SUMMARY OF THE INVENTION

The present invention addresses the above disadvantages. Thus, it is an objective of the present invention to provide an injector that mainly injects a high-pressure gaseous fuel, has limited wear and burn-in, and has an improved reliability. It is also an objective of the present invention to provide an injector with an improved ignition performance in injecting the high-pressure gaseous fuel to realize a stable operation.

To achieve the objective of the present invention, there is provided an injector for an internal combustion engine. The injector includes a nozzle, a needle, a control chamber, a working fluid supply passage, an electric switching valve, a high-pressure gaseous fuel supply passage and a lubrication liquid fuel supply passage. The nozzle has an injection hole, through which high-pressure gaseous fuel is injected into a combustion chamber of the engine. The needle is axially reciprocably received in the nozzle to open and close the injection hole of the nozzle. The needle includes a sliding portion and a valve portion. The valve portion closes the injection hole when the valve portion engages an inner surface of the nozzle. The sliding portion and the valve portion are exposed to the high-pressure gaseous fuel. The control chamber applies a pressure to the needle. The working fluid supply passage supplies liquid fuel, which serves as a working fluid, to the control chamber. The electric switching valve controls an inflow of the liquid fuel to the control chamber and an outflow of the liquid fuel from the control chamber. The high-pressure gaseous fuel supply passage supplies the high-pressure gaseous fuel to the injection hole. The lubrication liquid fuel supply passage supplies the liquid fuel, which serves as a lubrication, from the working fluid supply passage to the sliding portion and the valve portion of the needle.

BRIEF DESCRIPTION OF THE DRAWINGS

The invention, together with additional objectives, features and advantages thereof, will be best understood from the following description, the appended claims and the accompanying drawings in which:

DETAILED DESCRIPTION OF THE INVENTION

First Embodiment

A first embodiment of a present invention will be described with reference to FIGS. 1A to 4. Injectors 1 according to the first embodiment, directly inject a high-pressure gaseous fuel to cylinders of the multi-cylinder compression ignition engine. Each combustion chamber of the cylinder has the corresponding injector 1.

Figure 1B:
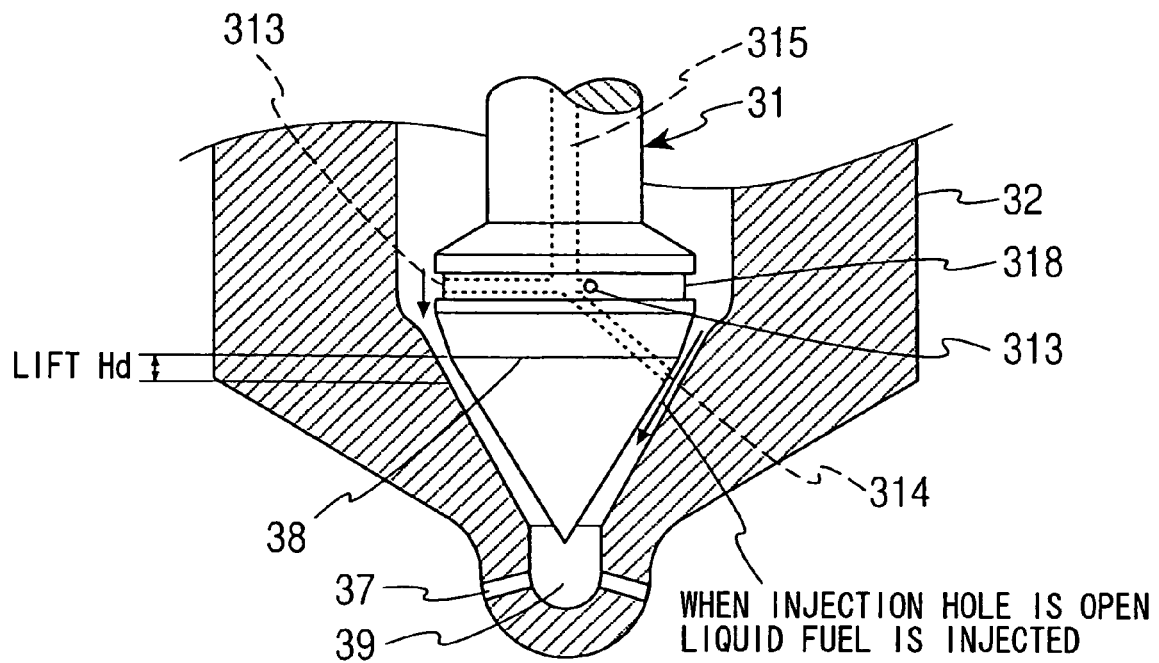
FIG. 1B is an enlarged view of a part I B in FIG. 1A showing a lower end portion of the nozzle.
Figure 2:
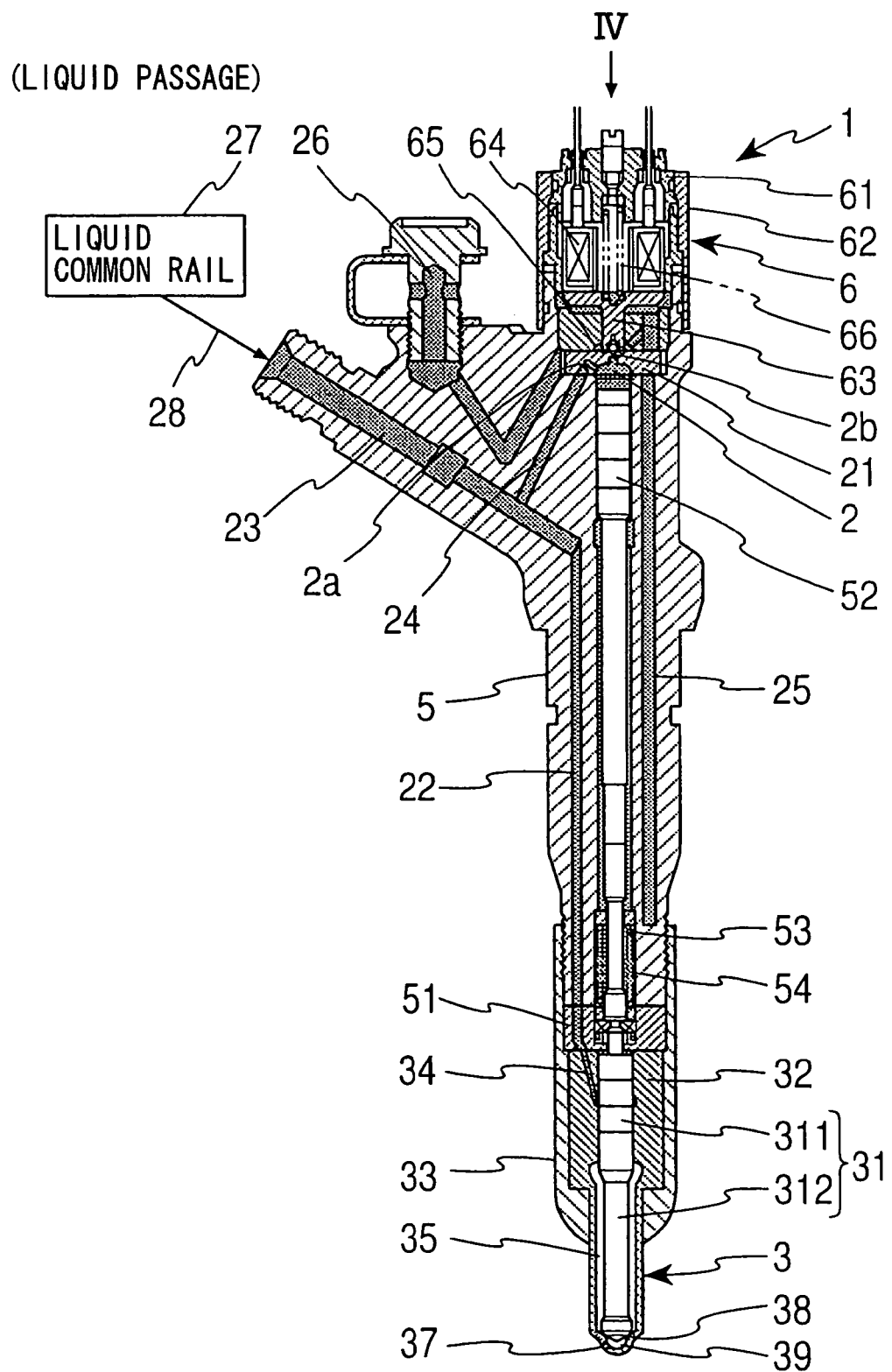
FIG. 2 is a schematic view taken along line II-II in FIG. 4 showing a supply passage of a high-pressure gaseous fuel of the injector according to the first embodiment.
Figure 3:
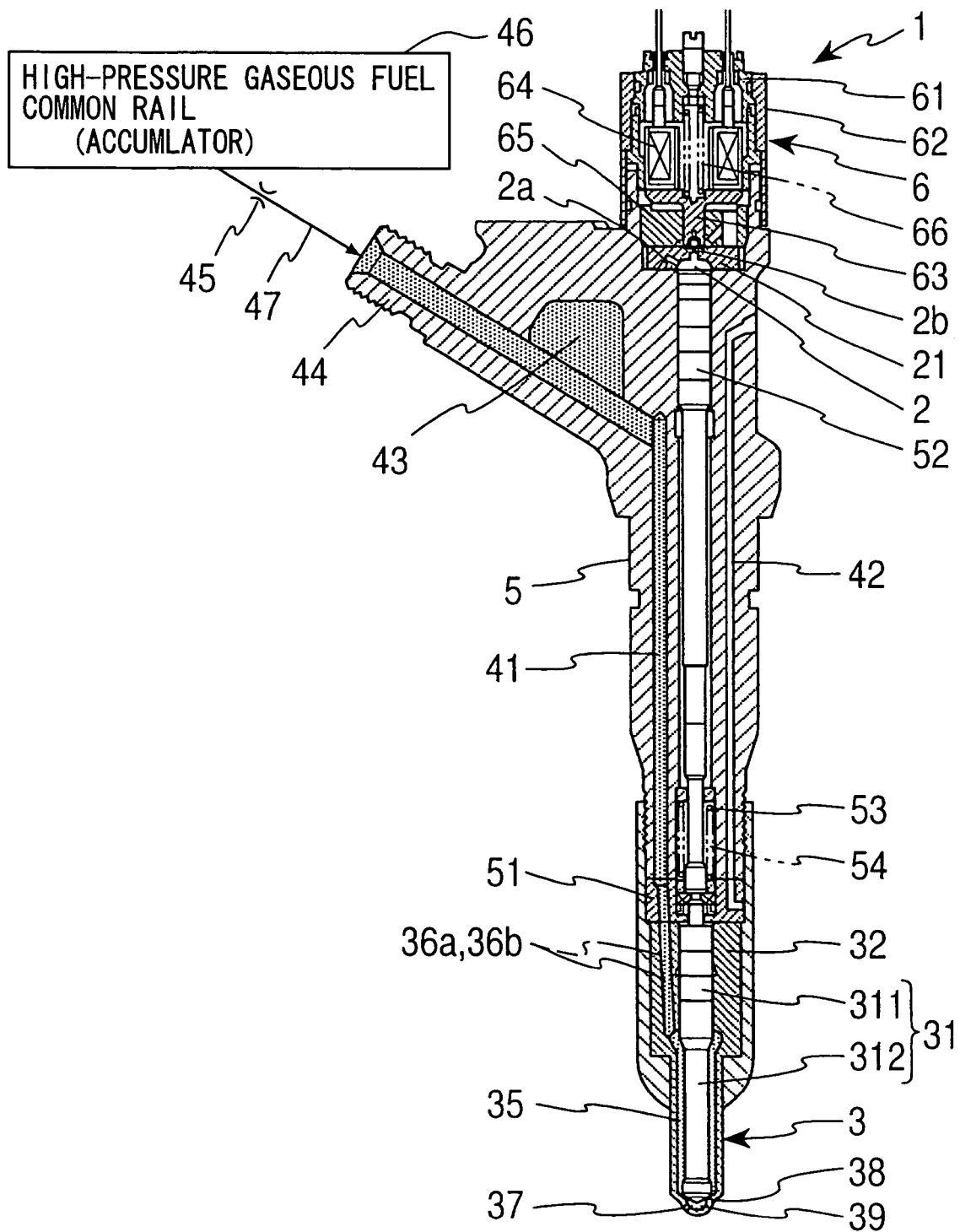
FIG. 3 is a schematic view taken along line III-III in FIG. 4 showing the supply passage of a working fluid of the injector according to the first embodiment.
Figure 4:
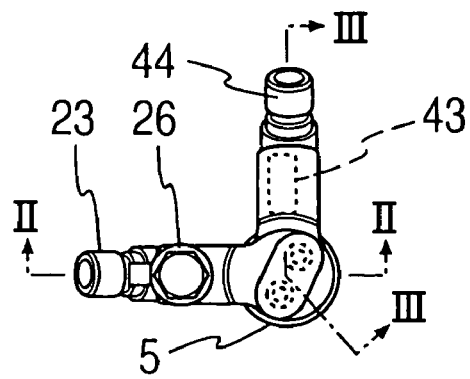
FIG. 4 is a top view of the injector viewed from a direction IV in FIG. 2 according to the first embodiment.

FIGS. 2 and 3 are longitudinal sectional views of the injector 1 according to the present embodiment. FIG. 1B is an enlarged view of a nozzle 3, which is a main part of the injector 1 according to the present embodiment. FIG. 2 describes a distribution passage of a working fluid, which is supplied to a control chamber 2 to drive the nozzle 3. FIG. 3 describes a supply passage of a high-pressure gaseous fuel, which is injected from the nozzle 3. A hydrogen fuel may serve as the high-pressure gaseous fuel. A liquid fuel, such as a light oil, serves as the working fuel. FIG. 4 is a plan view of the injector 1, which is a view from a direction indicated by IV in FIG. 2. FIG. 2 is a schematic view taken along line II-II in FIG. 4. FIG. 3 is a schematic view taken along line III-III in FIG. 4.

The present invention is characterized by using the liquid fuel, which is different from high-pressure gaseous fuel (or injection fuel) and serves as a working fluid for an on-off control of pressure in the control chamber 2. A needle 31 is driven to a closed position to close injection holes 37 by using pressure of the liquid fuel in the control chamber 2 (FIG. 2). The needle 31 is driven to an open position by using pressure of the high-pressure gaseous fuel in a nozzle chamber 35 (FIG. 3). In the control chamber 2, pressure is applied to drive the needle 31 to the closed position to close the injection holes 37. The structure of the control chamber 2 is known as a nozzle driving type for the liquid fuel injector. The injector 1, which injects gaseous fuel, is designed in the manner of this nozzle driving type to provide supply passages for the liquid fuel and the high-pressure gaseous fuel in one injector in order to control the injection.

In the present embodiment, a part of the liquid fuel, which is supplied to control the pressure in the control chamber 2, is supplied to a sliding portion to serve as a lubrication. Also, a small portion of the liquid fuel is injected into an engine combustion chamber along with the high-pressure gaseous fuel to serve as an ignition facilitating fuel. Thus, the liquid fuel, which is supplied as the working fluid, is effectively used to improve the lubricity and ignitability performance, in which the gaseous fuel injector may have disadvantages. A liquid fuel passage constitution to realize the above-described advantages will be described in detail later.

The ignitability performance is improved by injecting a small amount of the light oil (the liquid fuel), which is more liable to spontaneously ignite than a hydrogen gas (the gaseous fuel).

The basic structure of the injector 1 and the distribution passage of the working fluid will be described with reference to FIG. 2. In FIG. 2, the injector 1 includes an injector body 5, a nozzle 3 and a solenoid valve 6. The nozzle 3 is located at a lower side of the injector body 5 in such a manner that a tip gasket 51 is inserted between the injector body 5 and the nozzle 3. The solenoid valve 6, which serves as an electric switching valve, is located at an upper open end of the injector body 5 in such a manner that a plate member 21 is inserted between the solenoid valve 6 and the injector body 5. The nozzle 3 and tip gasket 51 are integrally fastened to the injector body 5 by using a retaining nut 33. The solenoid valve 6 is integrally fastened to the injector body 5 by using a nut 62.

The injector body 5 is formed into a tubular shape. A control piston 52 is slidably supported inside a tube hole of the tubular injector body 5. The control chamber 2 is formed at an upper end side of the control piston 52. In a tubular wall portion of the injector body 5, two working fluid passages face with each other in such a manner that the control piston 52 is located between the two working fluid passages. The two working fluid passages extend in a longitudinal direction (a vertical direction in FIG. 2). One of the two working fluid passages is a first high-pressure liquid passage 22. The other is a low-pressure fluid return passage 25. The first high-pressure liquid passage 22 communicates with a liquid inlet pipe 23, which is obliquely upwardly projected from an upper portion of the injector body 5. Also, the first high-pressure liquid passage 22 is connected with a liquid fuel common rail accumulator 27, which accumulates the liquid fuel at a predetermined high pressure, through a liquid supply pipe 28. The low-pressure liquid return passage 25 communicates with a liquid fuel tank (not shown) through a liquid discharging pipe 26, which is upwardly projected from the upper portion of the injector body 5.

The nozzle 3 slidably supports the stepped needle 31 inside a vertical hole, which is formed in a nozzle body 32 to extend in the longitudinal direction. An upper portion of the needle 31 is connected with a lower portion of the control piston 52, and the needle 31 vertically moves integrally with the control piston 52. The needle 31 is biased downwardly by a return spring 53, which is located in a spring chamber 54 that is located radially outwardly of a lower end of the control piston 52. A lower end of the high-pressure liquid passage 22 communicates with a second high-pressure liquid passage 34, which is located in the nozzle body 32. The second high-pressure liquid passage 34 opens around a guide portion 311, which is a large diameter portion of the needle 31. A structure of the liquid fuel passage (or an inside-needle fuel passage) inside the nozzle 3 is a characteristic feature of the present invention and will be described later. A lower end of the low-pressure liquid return passage 25 communicates with the spring chamber 54 and a recovered leak oil from each member of the injector flows through the low-pressure liquid return passage 25 and is discharged from a liquid discharge pipe 26.

The plate member 21 is located inside the upper open end of the injector body 5 in such a manner that the plate member 21 closes an open end of the tube hole, in which the control piston 52 slides. The control chamber 2 is defined by an upper end surface of the control piston 52, an inner wall of the tube hole above the control piston 52 and a recess portion, which is located in a center of a lower end surface of the plate portion 21. The control chamber 2 normally communicates with a high-pressure passage 24, which branches off the high-pressure liquid passage 22, through an inlet throttle portion 2a. The pressure in the control chamber 2 is applied downward to the needle 31 through the control piston 52. The control chamber 2 also communicates with the low-pressure liquid return passage 25 through an outlet throttle portion 2b. The pressure in the control chamber 2 is controlled through the solenoid valve 6, which controls the communication and discommunicated between the control chamber 2 and the low-pressure liquid return passage 25. The working fluid supply passage, which includes the fluid inlet pipe 23, the first high-pressure liquid passage 22, the high-pressure passage 24 and the inlet throttle portion 2a, is connected to the control chamber 2.

The solenoid valve 6 includes a solenoid body 61, a tubular solenoid 64 and a control valve 63. The tubular solenoid 64 is received by the solenoid body 61. The control valve 63 includes an armature and a ball valve. A cross section of the armature is formed into a T-shape, and an upper end of the armature faces with a lower end surface of the solenoid 64. The ball valve is supported by a hemispheric concave portion, which is located at a lower end portion of the armature. A low-pressure passage 65, which provides communication between the outlet throttle portion 2b and the low-pressure liquid return passage 25, is located around the lower end portion of the armature. The control valve 63 is biased downwardly by a spring 66, which is located inside the tubular solenoid 64, when not energized so that the ball valve closes the outlet throttle portion 2b of the control chamber 2.

FIG. 3 shows a supply passage of the high-pressure gaseous fuel to the injection holes 37, which are formed at an end of the nozzle 3. An annular space is defined by an inner peripheral wall of a nozzle body 32 and a stem portion 312, which is a small diameter portion of the needle 31, to form the nozzle chamber 35. A suction chamber 39 is formed below the annular space. The injection holes 37 are formed to penetrate through a wall, which forms the suction chamber 39. Two gaseous fuel passages, which extend in the longitudinal direction (the vertical direction in FIG. 3), are formed in the tubular wall portion of the injector body 5. One of the two gaseous fuel passages is a high-pressure gas passage 41 and the other is a leak gas recovering passage 42. The high-pressure gas passage 41 communicates with a high-pressure gas inlet pipe 44, which is obliquely upwardly projected from the upper portion of the injector body 5. The high-pressure gas passage 41 is connected to a high-pressure gaseous fuel common rail accumulator 46 (or an accumulator) through a high-pressure gas pipe 47 and a throttle 45. The leak gas recovering passage 42 communicates with a gaseous fuel tank (not shown) through an outlet 48, which is located at the upper portion of the injector body 5. The high-pressure inlet pipe 44 is formed at an angle of 90° from a projecting direction of the liquid inlet pipe 23 as shown in FIG. 4. A high-pressure gaseous fuel supply passage includes each passage, which provides connection between the high-pressure inlet pipe 44 and the injection holes 37.

It is desirable that a plurality of volume portions is formed on a passage to inject a large amount of the gaseous fuel with a low density in a short time. The passage is located between the high-pressure inlet pipe 44 and the high-pressure gas passage 41. The plurality of volume portions sharply enlarges a cross-section of the passage. The high-pressure gaseous fuel passage is located between the high-pressure gaseous fuel common rail accumulator 46 and the injection holes 37 of the injector 1. In the present embodiment, a cavity is formed inside the thick tubular wall portion, which is located along the passage to the high-pressure gas passage 41, and serves as an injector chamber 43. Also, the nozzle chamber 35 with a predetermined volume is formed around the stem portion 312, which is located in upstream of the injection holes 37, of the needle 31. The nozzle body 32 includes a plurality of feed passages 36a, 36b, which are connected to a lower end of the high-pressure gas passage 41, to effectively supply the high-pressure gaseous fuel to the nozzle chamber 35. The feed passages 36a, 36b make it possible to supply a large amount of high-pressure gaseous fuel to the nozzle chamber 35.

When the solenoid 64 is supplied with a drive current based on an opening command from a control device (not shown) to lift (or, to open) the control valve 63 against a spring force of the spring 66, the outlet throttle portion 2b of the control chamber 2 is opened. When the control valve 63 is opened, the high-pressure fuel in the control chamber 2 is discharged to the low-pressure liquid return passage 25 through the outlet throttle portion 2b and the low pressure passage 65. The outlet throttle portion 2b controls an amount of the high-pressure fuel supplied to the low-pressure passage 65 from the control chamber 2. The inlet throttle portion 2a controls an amount of the high-pressure fuel supplied to the control chamber 2 from the high-pressure passage 24 shown in FIG. 2. At this time, a passage area of the outlet throttle portion 2b is predetermined to be larger than that of the inlet throttle portion 2a. Thus, the pressure in the control chamber 2 is decreased by opening the control valve 63.

When the pressure in the control chamber 2 decreases, a downward force, which downwardly pushes the control piston 52 and the needle 31, is decreased. Thus, an upward force, which upwardly pushes the needle 31, of the high-pressure gaseous fuel in the nozzle chamber 35 becomes larger than a sum of downward forces, which downwardly push the needle 31, of the spring 53 and the decreased pressure of the liquid fuel in the control chamber 2. When the needle 31 is lifted so that a seating part 38 is detached from the nozzle body 32, the high-pressure gaseous fuel flows through the suction chamber 39, and is injected into the engine combustion chamber through the injection holes 37.

In the present invention as described above, the control chamber 2 is provided to produce a large driving force in order to effectively drive the needle 31. Here, the control chamber 2 serves to apply back pressure to the needle 31. Also, the injector 1 is structured to use the liquid fuel, which serves as the working fluid, to drive the control piston 52.

A detailed structure of the nozzle 3 will be described with reference to the enlarged view of the nozzle 3 shown in FIG. 1A. An end portion of the needle 31 is formed into a generally inverted cone shape. The needle 31 is biased downwardly by the pressure in the control chamber 2 (FIG. 2) and the spring force of the spring 53 so that the seating part 38 pressingly contacts with an inner peripheral surface, with which the seating part 38 faces, of the nozzle body 32. At this time, the suction chamber 39, which is defined by the nozzle body 32 and the needle 31, is discommunicated from the nozzle chamber 35, and the high-pressure gaseous fuel is not injected into the engine combustion chamber through the injection holes 37, which are openings of the suction chamber 39.

The nozzle chamber 35 is formed at a lower half portion of the nozzle body 32. An outer diameter of the stem portion 312 of the needle 31 is small, and a diameter of an inner surface 322 of the nozzle body 32 is large so that a volume capacity of the high-pressure gaseous fuel in the nozzle chamber 35 is increased. Specifically, the diameter of the inner surface 322 of the lower half portion of the nozzle body 32 is larger than a sliding diameter of the guide portion 311 of the needle 31. The outer diameter of the stem portion 312 of the needle 31 is smaller than the largest-diameter part of the generally cone end portion of the needle 31. In other words, the outer diameter of the stem portion 312 of the needle 31 is formed almost the same as a diameter of the seating part 38.

A volume of the high-pressure gaseous fuel at an immediately upstream space of the injection holes 37 is increased by increasing a volume of the nozzle chamber 35 inside the nozzle body 32 to appropriately achieve a flow rate and the pressure of the high-pressure gaseous fuel at an initial injection. Also, the high-pressure gaseous fuel is supplied to the nozzle chamber 35 from the injector chamber 43 inside the injector body 5 to inject a required amount of the high-pressure gaseous fuel without deteriorating the injection pressure. It is desirable that a volume of the injector chamber 43 is large enough (e.g., several ones $cm^3$) so that the injector 1 accumulates an one-injection amount of the high-pressure gaseous fuel. The injector chamber 43 is provided on the high-pressure gas passage 41. Other volume enlarging means may be applied inside the nozzle body 32 or the injector body 5.

In the present embodiment, the two feed passages 36a, 36b are formed in the nozzle body 32 to supply the high-pressure gaseous fuel to the nozzle chamber 35 from the high-pressure gas passage 41. The feed passages 36a, 36b are formed at a side of the guide portion 311 of the needle 31, and open at an upper end portion of the nozzle chamber 35. A plurality of the feed passages 36a, 36b may be formed to increase the volume of the gaseous fuel in the nozzle body 32. In other words, two or more of the feed passages may be formed in order to achieve a sufficient passage cross sectional area to enlarge the volume of the gaseous fuel in the nozzle body 32.

In the present embodiment, the part of the liquid fuel, which is supplied to control the pressure in the control chamber 2, is supplied to the nozzle sliding portion to serve as the lubrication. Also, the small portion of the liquid fuel is injected into the engine combustion chamber along with the high-pressure gaseous fuel to serve as the ignition facilitating fuel. Thus, the liquid fuel, which is supplied as the working fluid, is effectively used to improve the lubricity and ignitability performance, in which the gaseous fuel injector may have disadvantages. A structure of the liquid fuel passage to realize above-described advantages will be described.

The gaseous fuel is less lubricant than the liquid fuel. Thus, the injector may suffer from the wear of the nozzle 3. In the present embodiment, the second high-pressure liquid passage 34 is formed beside the guide member 311 of the needle 31, and opens at a slide hole 321, where the guide member 311 is slidably supported, to form the first lubrication liquid fuel supply passage. A plurality of annular grooves 317 is formed at an outer peripheral of the guide portion 311. The liquid fuel supplied from the second high-pressure liquid passage 34 lubricates a guide portion 311 and a slide hole of the nozzle body 32. The liquid, which smoothens the guide portion 311 and the slide hole of the nozzle body 32, is pushed above the guide portion 311 by the high-pressure gas in the nozzle body 32. Then the liquid leaks into the spring chamber 54 inside the injector body 5, flows through the low-pressure liquid return passage 25, and is recovered through the liquid outlet pipe 26.

Inside the needle 31, a needle fuel passage (or an inside-needle fuel passage) 315 is formed in such a manner that an upper end of the needle fuel passage 315 communicates with an annular groove 317 (the lowest-positioned annular groove in FIG. 1A) through a communicative hole 316. The needle fuel passage is also formed in such a manner that a lower end of the needle fuel passage 315 opens at the lower end portion of the needle 31. A seat lubrication liquid fuel supply hole 313 and an ignition facilitating liquid fuel supply hole 314 branch off the needle fuel passage 315 inside the lower end portion of the needle 31 to open at the lower end surface of the needle 31. The second high-pressure liquid passage 34 communicates with the lowest-positioned annular groove 317, in which the communicative hole 316 is formed, when the needle 31 is located at the highest position (or a communicating position) to open the injection holes 37. When the needle 31 opens the injection holes 37, the high-pressure fuel is led through the second high-pressure liquid passage 34, the annular groove 317, the communicative hole 316 and the needle fuel passage 315, and is supplied to fuel supply holes 313, 314, which are formed at the lower end portion of the needle 31. The second lubrication liquid fuel supply passage includes the needle fuel passage 315 and the seat lubrication liquid fuel supply hole 313. An ignition facilitating liquid fuel supply passage includes the needle fuel passage 315 and the ignition facilitating liquid fuel supply hole 314.

Figure 1A:
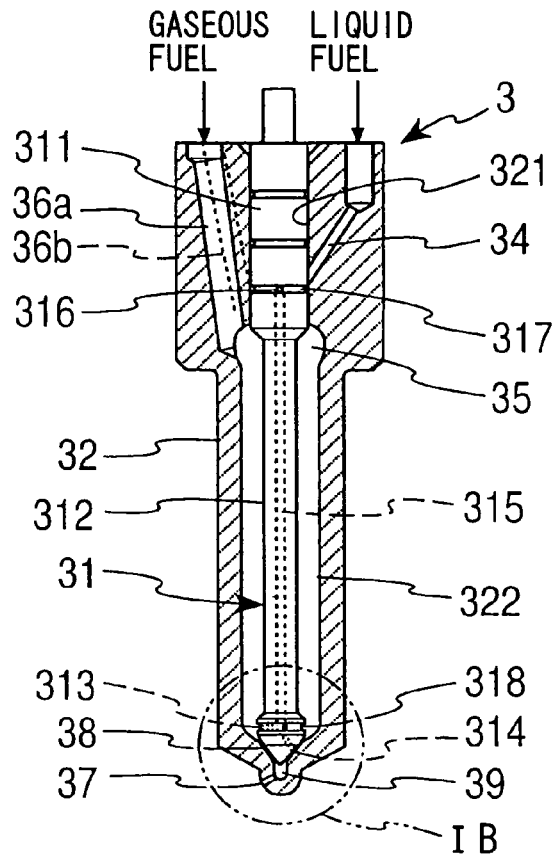
FIG. 1A is a sectional view of a main portion of an injector showing a structure of a nozzle of the injector according to a first embodiment of a present invention.

When the needle 31 is located at the closed position for closing the injection holes 37 as shown in FIG. 1A, the second high-pressure liquid passage 34 does not communicate with the annular groove 317. Also, the liquid fuel is not supplied to the lower end portion of the needle 31 through the needle fuel passage 315. In other words, only when the needle 31 is lifted to open the injection holes 37, the fuel is supplied to the lower end portion of the needle 31 through the needle fuel passage 315.

On an outer peripheral surface of the lower end portion of the needle 31, a seat annular groove (a circumferential groove) 318 is formed concentrically with an axis of the needle 31 at the upstream side of the seating part 38 as shown in FIG. 1B. A plurality of the seat lubrication liquid fuel supply holes 313 open at the seat annular groove 318. The seat lubrication liquid fuel supply holes 313 lubricate a downstream side of the seating part 38 by use of the liquid fuel, which is supplied through the second high-pressure liquid passage 34, the annular groove 317, the communicative hole 316 and the needle fuel passage 315. The second high-pressure liquid passage 34 is made communicative with the annular groove 317 when the injection holes 37 are open. At this time, the liquid fuel is drawn from the seat lubrication liquid fuel supply hole 313 by an amount for wetting a surface of the seating part 38. This is because the gaseous fuel flows slowly at high pressure around an area where the seat lubrication liquid fuel supply hole 313 opens. The seat annular groove 318 is formed to evenly wet the seating part 38 with the liquid fuel. The liquid fuel spreads entirely along the seat annular groove 318, and is transferred along a surface of the needle 31 by a flow force of the high-pressure gaseous fuel, which flows toward the injection holes 37 through the nozzle chamber 35. Then the seating part 38 is evenly wet.

Likewise, the seating part 38, which is located at the lower end of the needle, is lubricated with the liquid fuel, as well as the guide portion 311 of the needle 31. As a result, the wear of the sliding portion and the valve portion due to a shortage of the lubrication is limited. A plurality of the seat lubrication liquid fuel supply holes 313 may be alternatively formed to effectively supply the lubricant to the seat annular groove 318. In the present embodiment, two seat lubrication liquid fuel supply holes 313 are formed.

According to the present embodiment, the ignition facilitating liquid fuel supply hole 314 opens at an immediately downstream side of the seating part 38, which is located at the lower end of the needle 31 as shown in FIG. 1B. In this area, the gaseous fuel flows fast when the needle 31 is lifted to open the injection holes 37. Thus, the liquid fuel is drawn from the ignition facilitating liquid fuel supply hole 314 by phenomena of a spray, and is transferred by the flow force (an energy of a flow) of the gaseous fuel. Then, mists of the liquid fuel are injected to the engine combustion chamber through the injection holes 37 along with the gaseous fuel. At this time, the liquid fuel, which is supplied through the seat lubricate liquid fuel supply hole 313 at a previous injection to wet the seating part 38, is detached from the seating part 38. The liquid fuel is injected into the engine combustion chamber along with another liquid fuel, which comes from the ignition facilitating liquid fuel supply hole 314, and the gaseous fuel.

Likewise, the liquid fuel, which is injected into the cylinders, spontaneously ignites in a high-temperature high-pressure air in the engine combustion chamber to be an ignition source for the gaseous fuel, which is hard to ignite. Therefore, a stable combustion is achieved. In the present embodiment, the ignition facilitating liquid fluid supply hole 314 opens at the immediately downstream of the seating part 38. However, the ignition facilitating liquid fuel supply hole 314 may alternatively open at the immediately upstream of the seating part 38.

As described above, in the present embodiment, the second high-pressure liquid passage 34 communicates with the common needle fuel passage 315 by lifting the needle 31 to open the injection holes 37 to supply the liquid fuel to the guide portion 311. Then, the liquid fuel is supplied to the seat lubrication liquid fuel supply hole 313 and the ignition facilitating liquid fuel supply hole 314 by a predetermined leak amount. A predetermined amount of the liquid fuel drawn through the seat lubrication liquid fuel supply hole 313 and the ignition facilitating liquid fuel supply hole 314 is determined based on the pressure and the flow rate of the high-pressure gaseous fuel at the open hole area. And the drawn liquid fuel lubricates the seating part 38, or is injected along with the gaseous fuel. In the present embodiment, the flow amount of the liquid fuel is increased by prolonging an opening interval of the needle 31 to open the injection holes 37, in a case where an engine load is large. An injection amount of the liquid fuel is set equal to or less than an amount, which is required to idle the engine. Thus, the predetermined amount of the liquid fuel is effectively supplied at every injection. Therefore, both of the lubrication and the ignition performance are achieved with a simple passage structure.

Second Embodiment

A second embodiment will be described with reference to FIGS. 5 and 6. A present invention according to the second embodiment is different from the invention according to the first embodiment in the following points. The second high-pressure liquid passage 34 opens at the annular groove 317 when the needle 31 closes the injection holes 37 (or when the needle 31 is placed in a communication position). The seat lubrication liquid fuel supply hole 313 at the lower end portion of the needle 31 is located at immediately upstream of the seating part 38. The ignition facilitating liquid fuel supply hole 314 at the lower end portion of the needle 31 is located at immediately downstream of the seating part 38. Except for above-mentioned differences, a structure of a present embodiment is similar to that of the first embodiment. Similar components of a gaseous fuel injector 1 of the present embodiment, which are similar to the components of the injector 1 of the first embodiment, will be indicated by the same numerals. The second embodiment will be described through focusing on the differences.

Figure 5:
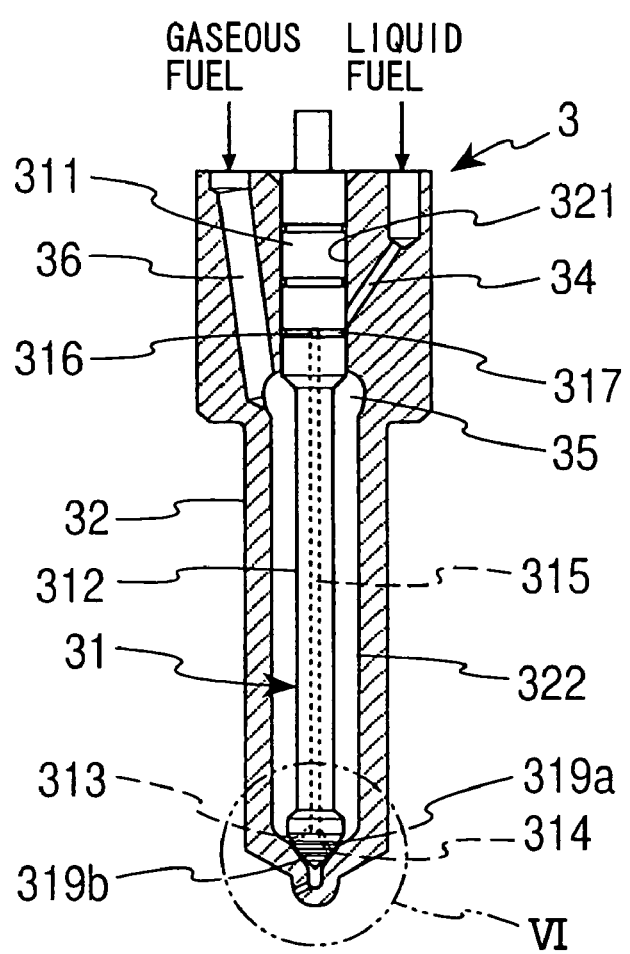
FIG. 5 is a sectional view of the nozzle structure of the injector according to a second embodiment of the present invention.

In the present embodiment, the second high-pressure liquid passage 34 communicates with the lowest-positioned annular groove 317, when the needle 31 is positioned at the lowest position to close the injection holes 37 as shown in FIG. 5. The communicative hole 316 is formed at the lowest-positioned annular groove 317. When the needle 31 closes the injection holes 37, the annular groove 317, the communicative hole 316, the needle fuel passage 315, the seat lubrication liquid fuel supply hole 313 and the ignition facilitating liquid fuel supply hole 314 are filled with the liquid fuel.

Figure 6:
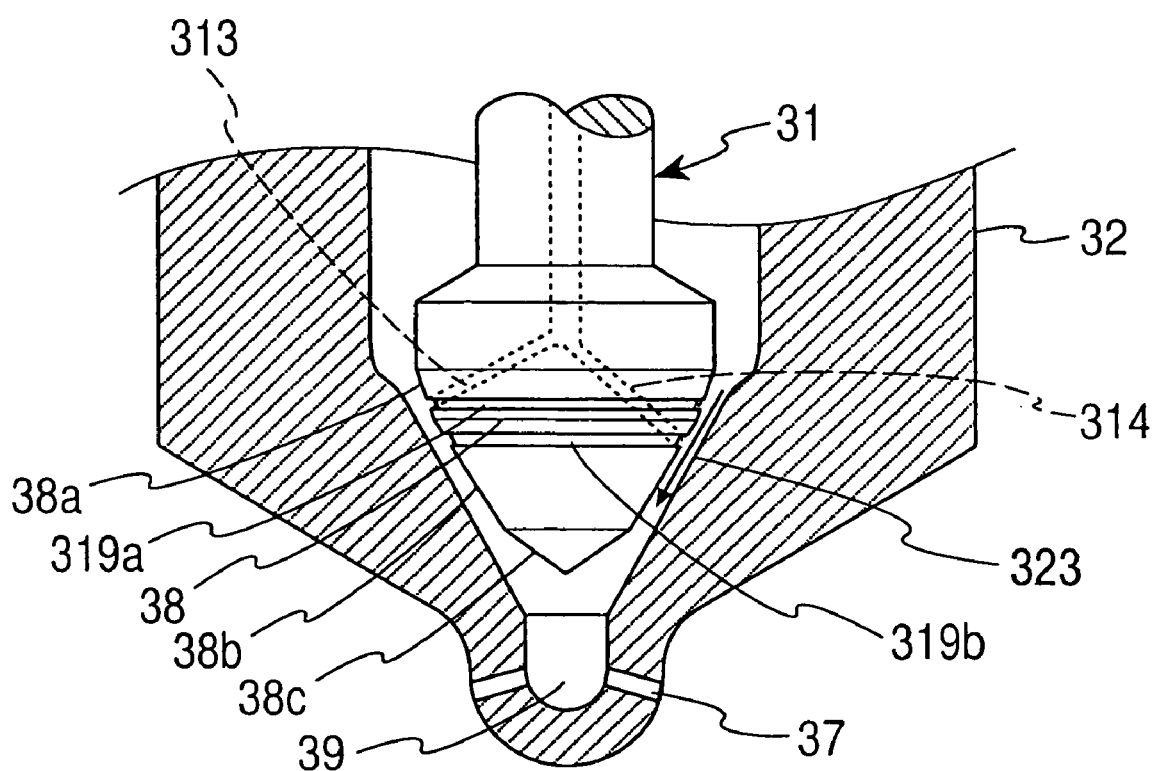
FIG. 6 is an enlarged view of a part VI in FIG. 5 showing structure of a nozzle lower end portion.

On the other hand, as shown in FIG. 6, at the outer peripheral surface of the lower end portion, the seat lubrication liquid fuel supply hole 313 opens at immediately upstream of the seating part 38. Also, the ignition facilitating liquid fuel supply hole 314 opens at immediately downstream of the seating part 38. A seat annular groove (the circumferential groove) 319a is formed concentrically with the axis of the needle 31 in such a manner where an opening of the seat lubrication liquid fuel supply hole 313 is located in the seat annular groove 319a. The seat annular groove 319a is a slight cavity at an upstream side of the seating part 38. A seat annular groove (the circumferential groove) 319b is formed concentrically with the axis of the needle 31 in such a manner where an opening of the ignition facilitating liquid fuel supply hole 314 is located in the seat annular groove 319b. The seat annular groove 319b is the slight cavity at a downstream side of the seating part 38. The seat lubrication liquid fuel supply hole 313 and the ignition facilitating liquid fuel supply hole 314 are closed when the needle 31 closes the injection holes 37. This is realized because the seating part 38 of the needle 31 is pressingly contacts the seat surface 323 of the nozzle body 32, and because a difference between cone angles of two cone surfaces 38a, 38b, which are formed at the lower end of the needle 31, is predetermined to be small.

Specifically, the cone angle of the cone surface 38b, which is located in the downstream side of the seating part 38, is larger than that of the seat surface 323 of the nozzle body 32 by one degree. Also the cone angle of the cone surface 38a, which is located in the upstream side of the seating part 38, is smaller than that of the seat surface 323 of the nozzle body 32 by one degree. In a case where the cone surface 38 is formed till the lower end of the needle 31, a passage area to the suction chamber 39 may be decreased due to the cone surface 38b. Therefore, a third cone surface 38c is formed at the lower end of the needle 31 so that a passage area to the suction chamber 39 may not be decreased. A cone angle of the third cone surface 38c is larger than that of the seat surface 323 of the nozzle body 32 by one degree. In the present embodiment, a difference between the cone angles of the third cone surface 38c and the seat surface 323 is 15 degree.

The seat surface 323 and the cone surfaces 38a, 38b, 38c at an above-described valve seating part are arranged in such a manner that the liquid fuel seeps through the seat lubrication liquid fuel supply hole 313 and the ignition facilitating liquid fuel supply hole 314 to wet the seat surface 323. The seat annular grooves 319a, 319b, which are slight cavities on the cone surfaces 38a, 38b, are formed in such a manner that the opening of the fuel supply holes 313, 314 are located in the annular grooves 319a, 319b. Thus, the seat surface 323 is wetted along the whole seat annular grooves 319a, 319b to improve the lubricity.

In the above described structure, when the needle 31 opens the injection holes 37, the liquid fuel is drawn from the seat lubrication liquid fuel supply hole 313 and the ignition facilitating liquid fuel supply hole 314 by the flow force of the gaseous fuel, which flows toward the injection holes 37. Then, the drawn liquid fuel is transported to the combustion chamber, and serves as the ignition source similarly to the first embodiment. In the present embodiment, it is different from the first embodiment that the annular groove 317 is discommunicated from the second high-pressure liquid passage 34, when the needle 31 opens the injection holes 37. When the annular groove 317 is discommunicated, pressures in the annular groove 317, the communicative hole 316, the needle fuel passage 315 and the fuel supply hole 313, 314 are decreased.

Therefore, an own pressure of the liquid fuel does not push the liquid fuel itself out of the liquid fuel supply holes 313, 314. Instead, the liquid fuel is drawn out of the liquid fuel supply holes 313, 314 only by a drawing force of the gaseous fuel. Thus, the liquid fuel, which is not drawn by the gaseous fuel, remains at outlets of the liquid fuel supply holes 313, 314 and the seat annular grooves 319a, 319b.

The remained liquid fuel limits the wear of the seat surface 323, the seating part 38 of the needle 31 and the cone surfaces 38a, 38b.

In the present embodiment, a maximum amount of the liquid fuel injected along with the gaseous fuel is an amount of the fuel, which fills the annular groove 317, the communicative hole 316, the needle fuel passage 315, the seat lubrication liquid fuel supply hole 313, the ignition facilitating liquid fuel supply hole 314 and the seat annular groove 319a, 319b. Similarly to the first embodiment, the amount of the drawn liquid fuel depends on the opening interval of the injection holes 37.

A supply amount of the liquid fuel for the lubrication of the seating part is determined independently of a supply amount of the liquid fuel for facilitating the ignition. The supply amount of the liquid fuel for facilitating the ignition is set larger than the supply amount of the liquid fuel for the lubrication of the seating part.

According to the present invention, the liquid fuel (or the working fluid for control the needle) is supplied to the nozzle to serve as the lubrication or to facilitate the ignition. Therefore, the lubrication and the ignition control are improved. Therefore, the wear of the injection nozzle is limited. The wear is a disadvantage of a cylinder direct injection engine. Also, the ignition performance is improved to realize a stable combustion. A poor ignition performance is a disadvantage of a compression ignition engine. Then, a power of the engine is increased. Also, an amount of unburned fuel exhaust is decreased.

In the present embodiment, the liquid fuel is supplied to the sliding portion of the needle at high pressure. Also at the same time, a predetermined amount of leak liquid fuel may be transferred toward the seating part to limit the wear of the seating part and to facilitate the ignition. Further, the injector may measure a predetermined amount of the liquid fuel to the seating part by using a nozzle lift. Also, the communication with a liquid fuel supply portion may be controlled through an open/close control by a needle lift. Then, hydrogen gas is limited from inflowing to the liquid fuel supply portion and the liquid fuel is limited from excessively outflowing from the liquid fuel supply portion. Also a back flow of combustion gas is limited. Therefore, a high-performance injector with a simple structure is realized.

Additional advantages and modifications will readily occur to those skilled in the art. The invention in its broader terms is therefore not limited to the specific details, representative apparatus, and illustrative examples shown and described.

What is claimed is:

1. An injector for an internal combustion engine, the injector comprising:
a nozzle that has an injection hole, through which high-pressure gaseous fuel is injected into a combustion chamber of the engine;
a needle that is axially reciprocably received in the nozzle to open and close the injection hole of the nozzle, wherein:
the needle includes a sliding portion and a valve portion;
the valve portion closes the injection hole when the valve portion engages an inner surface of the nozzle; and
the sliding portion and the valve portion are exposed to the high-pressure gaseous fuel;
a control chamber for applying a pressure to the needle;
a working fluid supply passage for supplying liquid fuel, which serves as a working fluid, to the control chamber;
an electric switching valve for controlling an inflow of the liquid fuel to the control chamber and an outflow of the liquid fuel from the control chamber;
a high-pressure gaseous fuel supply passage for supplying the high-pressure gaseous fuel to the injection hole; and
a lubrication liquid fuel supply passage for supplying the liquid fuel, which serves as a lubrication, from the working fluid supply passage to the sliding portion and the valve portion of the needle, wherein:
the sliding portion of the needle includes a glide portion;
the nozzle includes a slide hole, which slidably receives the guide portion;
the value portion of the needle includes a seating part;
the lubrication liquid fuel supply passage, includes:
a first lubrication liquid fuel supply passage, which communicates with the working fluid supply passage at a first end, wherein a second end of the first lubrication liquid fuel supply passage opens at the slide hole; and
a second lubrication liquid fuel supply passage, which is located inside the needle, wherein:
a first end of the second lubrication liquid fuel supply passage opens at the outer peripheral surface of the guide portion to communicate with the first lubrication liquid fuel supply passage; and
a second end of the second lubrication liquid fuel supply passage opens at an upstream side of the seating part of the needle; and
wherein the second lubrication liquid fuel supply passage is constructed such that the first end of the second lubrication liquid fuel supply passage is communicated and discommunicated relative to the first lubrication liquid fuel supply passage through opening and closing the injection hole by the needle.

2. The injector according to claim 1, wherein:
the first end of the second lubrication liquid fuel supply passage and the second end of the first lubrication liquid supply passage are communicated with each other when the needle is placed in a communicating position; and
the first end of the second lubrication liquid fuel supply passage and the second end of the first lubrication liquid supply passage are discommunicated from each other when the needle is placed in spaced away from the communicating position.

3. The injector according to claim 1, wherein the needle includes a circumferential groove, which is located in the upstream side of the seating part, and the second end of the second lubrication liquid fuel supply passage opens at the circumferential groove.

4. An injector for an internal combustion engine, the injector comprising:
a nozzle that has an injection hole, through which high-pressure gaseous fuel is injected into a combustion chamber of the engine;
a needle that is axially reciprocably received in the nozzle to open and close the injection hole of the nozzle;
a control chamber for applying a pressure to the needle;

a working fluid supply passage for supplying liquid fuel, which serves as a working fluid, to the control chamber;

an electric switching valve for controlling an inflow of the liquid fuel to the control chamber and an outflow of the liquid fuel from the control chamber;

a high-pressure gaseous fuel supply passage for supplying the high-pressure gaseous fuel to the injection hole; and an ignition facilitating liquid fuel supply passage for supplying the liquid fuel, which facilitates an ignition, from the working fluid supply passage to the high-pressure gaseous fuel supply passage that is located in a distal end portion of the nozzle, wherein the liquid fuel is injected along with the high-pressure gaseous fuel in a case where the injection hole is opened;

the nozzle includes a seat surface;

the needle includes a seating part that is disposed to face the seat surface;

the ignition facilitating liquid fuel supply passage is located inside the needle;

a first end of the ignition facilitating liquid fuel supply passage communicates with the working fluid supply passage;

a second end of the ignition facilitating liquid fuel supply passage opens near the seating part of the needle; and the liquid fuel, which facilitates the ignition, is injected by use of an energy of a flow of the high-pressure gaseous fuel flowing toward the injection hole through a space between the seat surface and the needle..

5. The injector according to claim 4, wherein the needle includes a guide portion, the injector further comprising a lubrication liquid fuel supply passage for supplying the liquid fuel, which serves as a lubrication, from the working fluid supply passage to the guide portion of the needle, wherein the first end of the ignition facilitating liquid fuel passage opens at the guide portion of the needle to communicate with the working fluid supply passage through the lubrication liquid fuel supply passage.

6. The injector according to claim 5, wherein the needle includes a circumferential groove, which is located in a downstream side of the seating part, wherein the lubrication liquid fuel supply passage opens at the circumferential groove.

7. The injector according to claim 5, wherein:

the lubrication liquid fuel supply passage is a first lubrication liquid fuel supply passage;

the nozzle includes a slide hole, which slidably receives the guide portion of the needle; and the ignition facilitating liquid fuel supply passage is a common inside-needle fuel passage, which commonly supplies the liquid fuel both to serve as the lubrication and to facilitate the ignition, the injector further comprising a second lubrication liquid fuel supply passage, which is located inside the needle, wherein:

the first end of the first lubrication liquid fuel supply passage communicates with the working fluid supply passage;

the second end of the first lubrication liquid fuel supply passage opens at the slide hole, which slidably receives the guide portion of the needle;

a first end of the second lubrication liquid fuel supply passage communicates with the second end of the first lubrication liquid fuel supply passage through the common inside-needle fuel passage; and a second end of the second lubrication liquid fuel supply passage opens at an upstream side of the seating part of the needle.

8. The injector according to claim 4, wherein the flow of the high-pressure gaseous fuel draws the liquid out of the second end of the ignition facilitating liquid fuel supply passage.

9. The injector according to claim 4, wherein the seat surface is disposed at an inner surface of the nozzle upstream of the injection hole.

* * * * *